United States Patent [19]

Christy et al.

[11] 4,249,312

[45] Feb. 10, 1981

[54] LEAD CHOPPER

[76] Inventors: Ronald I. Christy, 26615 Ocean View Dr.; Martin L. Anderson, 4347 Hillview Dr., both of Malibu, Calif. 90265

[21] Appl. No.: 28,507

[22] Filed: Apr. 9, 1979

Related U.S. Application Data

[62] Division of Ser. No. 916,774, Jun. 19, 1978.

[51] Int. Cl.³ .............................................. B23D 35/00

[52] U.S. Cl. ........................................ 30/315; 30/329; 30/340

[58] Field of Search ................................. 30/329-339, 30/315, 340; 145/24, 25

[56] References Cited

U.S. PATENT DOCUMENTS

| | | | |
|---|---|---|---|
| 1,533,305 | 4/1925 | Burton | 145/24 X |
| 2,828,543 | 4/1958 | Valentine | 30/333 |

FOREIGN PATENT DOCUMENTS

| | | | |
|---|---|---|---|
| Ad.20483 | of 1910 | United Kingdom | 30/336 |

*Primary Examiner*—J. M. Meister

*Attorney, Agent, or Firm*—Noel B. Hammond; Kenneth W. Float

[57] ABSTRACT

A cutting tool for cutting soft ductile materials such as came (a lead or lead alloy extrusion used for leaded glass) without distortion. A thin steel blade is rapidly accelerated by impulse to cut the same. The blade is accelerated either by an electrical solenoid, a hammer, or other suitable means.

1 Claim, 5 Drawing Figures

Fig. 1.
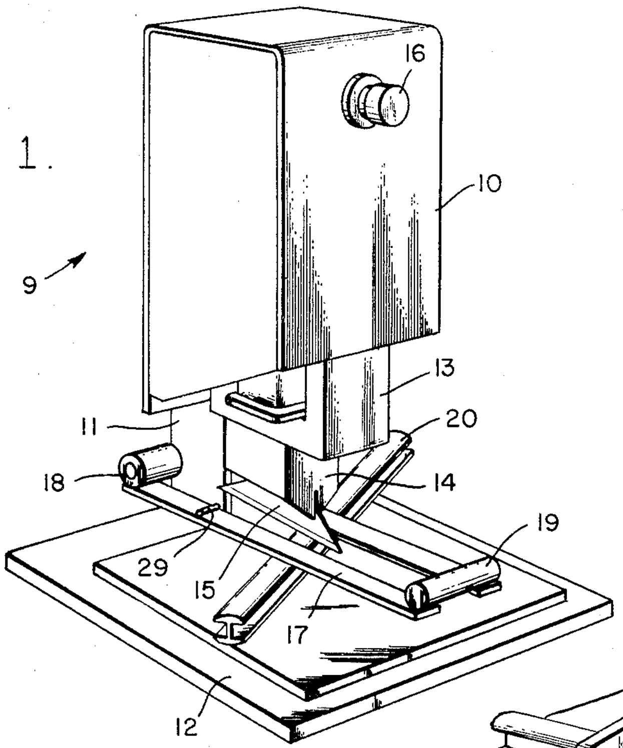
Fig. 2.
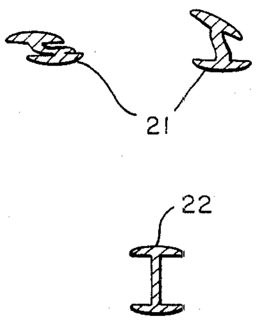
Fig. 5.
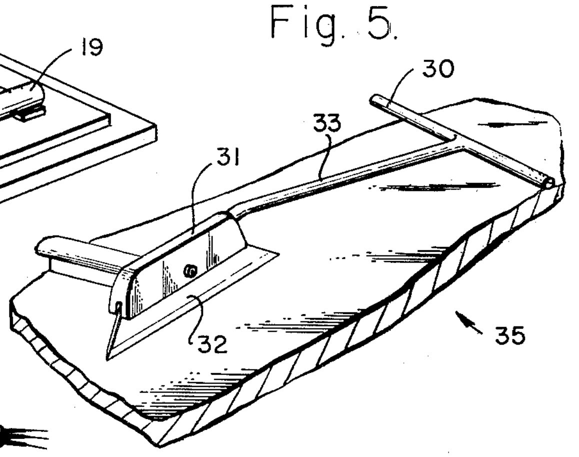
Fig. 3.
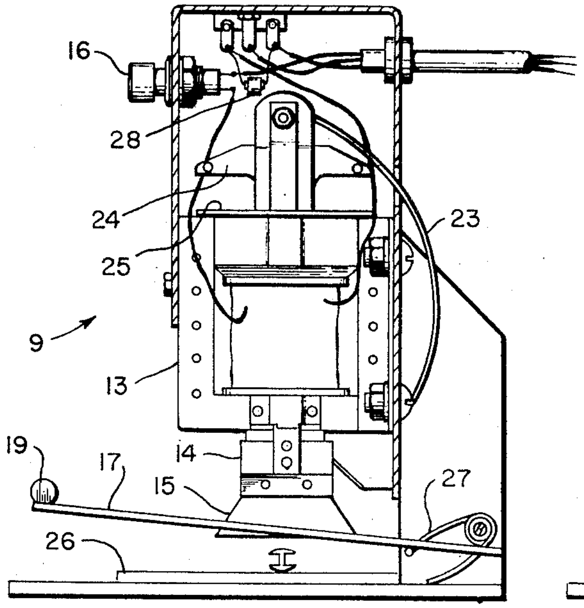
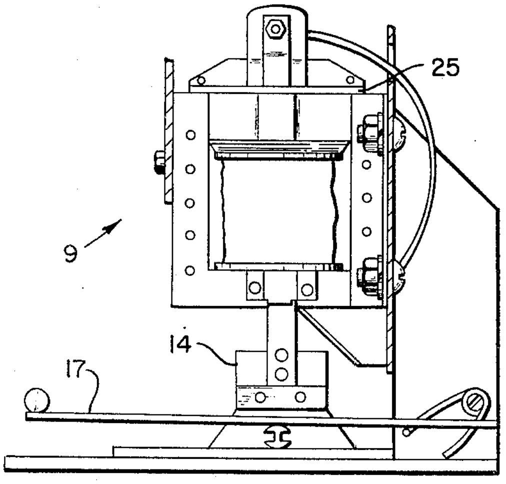
Fig. 4.

LEAD CHOPPER

CROSS REFERENCE TO RELATED APPLICATIONS

This application is a division of our prior copending application for "Lead Chopper," Ser. No. 916,744 filed June 19, 1978.

FIELD OF THE INVENTION

This invention relates to cutting tools for soft materials and, more particularly, to improved cutting of came for use in leaded glass.

BACKGROUND OF THE INVENTION

Heretofore, came has been cut using a hand-held lead knife pushed through the lead. This method almost always distorts or flattens came, requiring further work to re-straighten the came after cutting. Other methods include standard cutting tools, such as power band saws. This is not practical, except in production, where a large number of pieces of each length are to be cut. Any high-speed saw-type tool also produces lead dust that is a severe health hazard. The larger cutting tools are less portable and cannot be used directly on the assembly table for doing leaded-glass work.

Accordingly, it is an object of the present invention to provide a clean cut of soft ductile materials such as came or the like so that rework is eliminated.

Another object of the invention is to provide a small lightweight portable cutter that can be used where needed, close to the work.

Yet another object of the invention is to provide a cutting tool that produces no powder, chips, or debris, in order to eliminate possible health hazards.

A further object of the present invention is to provide a cutting tool that automatically produces a right-angle or 90° cut, with respect to the base.

An even further object of the invention is to provide a cutting tool that is extremely fast and convenient, compared to apparatus employed heretofore for cutting soft ductile materials.

SUMMARY OF THE INVENTION

In accordance with these and other objects of the invention, there is provided a blade holder and a means of rapidly accelerating a thin blade to produce a distortion-free cut in soft ductile materials such as came or the like. The blade acceleration may provide automatically, either electrically, pneumatically, or with hydraulics, or by hand using a hammer, or by any other suitable means. The thin blade does not distort the came because of the speed of the cut compared to the inertia of the material being cut.

BRIEF DESCRIPTION OF THE DRAWINGS

The foregoing and other objects and features of the present invention may be more readily understood with reference to the following detailed description taken in conjunction with the accompanying drawings, wherein like reference numerals designate like structural elements, and in which:

FIG. 1 is a perspective view of a lead chopper driven by an electric solenoid constructed in accordance with the present invention;

FIG. 2 is a cross-sectional view of came cut by prior art methods and cut using a lead chopper of the present invention;

FIG. 3 is a side view of the lead chopper of FIG. 1 shown with the blade in the up position, and the side cover off;

FIG. 4 shows the lead chopper of FIGS. 1 and 3 with the blade in the down position; and FIG. 5 is a perspective view of a hand-held hammer-driven lead chopper constructed in accordance with the present invention.

DESCRIPTION OF THE EXEMPLARY EMBODIMENTS

Referring to the drawings, FIG. 1 shows a lead chopper 9 of the type actuated by an electric solenoid, as described in greater detail hereinafter. While the lead chopper 9 of FIG. 1 chosen to illustrate the invention is of the electric solenoid type, the lead chopper construction of the invention is not limited to such construction, and it can be constructed using pneumatic, hydraulic, mechanical impulse or other suitable means of providing a sharp acceleration of the blade for cutting. In various other respects also, such as details of construction, materials referred to, and dimensional relationship, the following-described lead choppers are set forth solely for illustrating the invention and are not to be taken as limiting.

The lead chopper 9 of FIG. 1 comprises a housing 10 attached to an upright member 11 and base 12. An electric solenoid 13 is mounted onto the housing 10. A blade holder 14 is attached to the armature 24 (FIG. 3) of the solenoid 13 so that as the solenoid 13 is energized, the blade holder 14 and a blade 15 which is attached thereto are rapidly accelerated downward. A push button 16 is provided to make the connection that energizes the solenoid 13. A hold-down-bar 17 connected to said upright member 11 is provided with a hinge pivot 18 and a finger rest 19 to firmly position the part 20 to be cut. A mechanical advantage of about two to one between the force applied by hand at the finger rest 19 and the force holding the part 20 to be cut is provided by the hold-down-bar 17. The hold-down-bar 17 also acts as a safety guard for the blade 15.

FIG. 2 shows examples of cross-sectional views of distorted came 21 as cut by hand, compared to undistorted came 22 cut by the lead chopper 9.

FIG. 3 shows a side view of the lead chopper 9 with the side cover off, exposing the entire solenoid 13. The blade 15 is shown in the up position. As the blade 15 is accelerated downward by the solenoid 13, a solenoid return spring 23 coupled between the housing 10 and the armature 24 is elastically deformed, and the solenoid armature 24 contacts a thin elastic rubber pad 25 that stops the acceleration. The blade 15 has then cut through the came and is just contacting a non-metal rigid pad 26. At this point in the operation cycle, the push button 16 is released, deenergizing the solenoid 13 and the solenoid return spring 23 retracts the solenoid armature 24 and blade 15 upward automatically. It is important to select a thin rubber pad 25 to match the characteristics of the solenoid 13 in order to decelerate the blade 15 at the bottom of the stroke. This significantly extends blade life and reduces the problems of incomplete cuts or undue cutting into the non-metal rigid pad 26. A 1/16 inch thick silicon rubber pad has been found to work well for the elastic rubber pad 25, and a ⅛ inch thick piece of tempered masonite has worked well for the non-metallic rigid pad 26. The solenoid 13 may be operated on either AC or DC electric current provided it is designed for AC current initially. Good results have been obtained using AC current, and half wave rectifying it with a diode 28. This produces a pulsed acceleration that is of advantage in cutting came. Similar effects can be produced using pneumatics or hydraulics. Another advantage of the pulsing effect is that it produces a loud buzzing sound if the push button 16 is held down for more time than necessary, causing the operator to release it sooner, saving time and electrical energy. Various guides or adjustable stops can be attached to the lead chopper or workbench for cutting quantities of parts all to the same length and angle of cut. The lead chopper can also be used for cutting wood, rubber, or any other relatively soft material.

In FIG. 4, the blade 15 is shown extended fully downward, at the instant of completion of a cut. The hold-down-bar 17 also has a return spring 27 to lift the hold-down-bar 17 when released. A pin 29 shown in FIG. 1 prevents the hold-down-bar 17 from contacting the blade holder 14 when it is extended fully downward and the hold-down-bar 17 is released in the up position.

FIG. 5 shows a hand-held lead cutter 35 for use where the larger lead chopper 9 of FIG. 1 will not reach, such as a piece of came already attached to a large stained glass window. A short cross bar 30 rests on the table to maintain the blade 32 perpendicular to the part being cut. A short rod 33 connects the short cross bar 30 to a thin blade holder 31. A small hand-held hammer is used to lightly strike the top of the blade holder 31 to drive the blade 32 through the came. This embodiment (FIG. 5) requires more operator skill but is far less expensive, and may be used directly on partially assembled stained glass pieces. Both the automatic lead chopper 9 of FIGS. 1, 3 and 4 and the manual lead cutter 35 of FIG. 5 produce clean distortion-free cuts of came or similar materials almost instantly, saving time, producing no debris, and not requiring costly re-straightening of came or other similar materials.

Thus there has been described two embodiments of a lead chopper which provides a clean cut of soft ductile materials such as came or the like so that rework is eliminated. The lead chopper is small, lightweight, and portable being easily moved with one hand so as to be useable close to the work where needed. Possible health hazards due to powder, chips, or debris from cutting are eliminated using the lead chopper, due to the single cutting stroke of the thin blade. The blade is positioned perpendicular to the base, assuring a right angle cut, that is extremely fast and convenient compared to apparatus employed heretofore for cutting soft ductile materials.

It is to be understood that the above-described embodiments are merely illustrative of but a small number of the many possible specific embodiments which can represent applications of the present invention. Numerous and varied other arrangements can be readily devised in accordance with these principles by those skilled in the art without departing from the spirit and scope of this invention.

What is claimed:

1. A tool for cutting soft ductile material which is positioned on a substantially flat surface, by rapidly accelerating a thin blade through the material using a hand-held hammer to eliminate distortion from cutting, said tool comprising:

a thin holder for holding replaceable blades;

a blade disposed in said holder;

a short rod attached to one end of said blade holder extending back in a direction parallel to the plane of the blade;

a short cross bar attached to the end of said rod opposite the blade holder and perpendicular to both said rod and the plane of the blade, said cross bar being adapted to lie on said flat surface and adapted to orient the blade perpendicular to the surface;

the tool being adapted to rest on the flat surface with the blade edge parallel to and in contact with the flat surface, and the cross bar resting on the surface, maintaining the blade perpendicular to the flat surface; whereby when using said tool, the cross bar is held down on the surface and the blade holder and blade are lifted up over the piece to be cut; and with the blade resting on the piece to be cut, a hammer is used to strike the blade holder directly over the blade, accelerating the blade through the piece to be cut.

* * * * *